United States Patent [19]

Kimura et al.

[11] Patent Number: 5,757,825
[45] Date of Patent: May 26, 1998

[54] DIGITAL SIGNAL PROCESSING FOR CONTROLLING ERROR CORRECTION BASED ON THE STATE OF THE CONTROL BIT

[75] Inventors: Kazuhiro Kimura, Fukaya; Shigeaki Hayashibe, Gunma-ken; Yutaka Hirakoso, Gyoda; Takahiko Masumoto; Shizuka Ishimura, both of Gunma-ken; Toshiyuki Ozawa, Ota; Munehiro Suka, Tokyo-to, all of Japan

[73] Assignee: Sanyo Electric Co., Ltd., Osaka, Japan

[21] Appl. No.: 588,639

[22] Filed: Jan. 19, 1996

[30]     Foreign Application Priority Data

Jan. 20, 1995  [JP]  Japan ................... 7-007710

[51] Int. Cl.⁶ .................................................. F01B 25/06
[52] U.S. Cl. .................................. 371/37.7; 371/37.4
[58] Field of Search .......................... 371/37.7, 43, 31, 371/37.4, 37.5, 37.3, 37.1, 38.1, 30, 40.2; 340/825.65; 348/373, 473, 475, 617

[56]         References Cited

U.S. PATENT DOCUMENTS 3,538,497  11/1970  Harmon .
3,789,360   1/1974  Clark et al. ........................ 371/43.4

Primary Examiner—Stephen M. Baker
Assistant Examiner—Marc McDievnel
Attorney, Agent, or Firm—Loeb & Loeb LLP

[57]         ABSTRACT

In multiplex FM broadcasting, a digital signal is composed of a frame which consists of a predetermined number of blocks in the vertical direction, a block consisting of a predetermined number of bits in the horizontal direction and having a horizontal parity (error correcting code) for correcting errors in the horizontal direction and a vertical parity for correcting errors in the vertical direction. The block also has a control bit for determining whether the error correction in the horizontal direction is to be carried out only once. A decoding identification detector (20) detects the content of the control bit, a controller (12) controls the re-writing of the digital signal into a frame buffer (13) after the error correction of the digital signal in the vertical direction by an error corrector (14). The controller (12) also controls the provision of the digital signal stored in the buffer (13) to the error corrector (14) according to the content of the control bit, determining whether the second error correction in the horizontal direction is to be carried out.

14 Claims, 9 Drawing Sheets

DIGITAL SIGNAL PROCESSING FOR CONTROLLING ERROR CORRECTION BASED ON THE STATE OF THE CONTROL BIT

FIELD OF THE INVENTION

The present invention relates to a method for processing digital signals in a multiplex FM radio receiver, particularly to a method for processing digital signals used with a movable body.

BACKGROUND OF THE INVENTION

In multiplex FM broadcasting, digital signals are transmitted which represent characters or figures and are superimposed on sound signals. The structure of a frame of the digital signal is shown in FIG. 1. The frame is composed of 272 blocks, and a block identification code (BIC) composed of 16 bits is added to the front of each block. The BIC is used in reproducing the synchronism information of the frame and block. 190 out of the 272 blocks are packets for transmitting data. The other 82 blocks are parity packets for transmitting the parities in the vertical direction. Each block sequentially has the BIC, a data packet composed of 176 bits, a cyclic redundancy code (CRC) composed of 14 bits and a parity (error correcting code) composed of 82 bits. The error correction by the parity bits within the block is called "error correction in the horizontal direction". The error correction by the 272 bits selected from the same place of the 272 blocks is called "error correction in the vertical direction".

Multiplex FM signals on which such digital signals are imposed are received through an antenna 1 of a multiplex FM radio receiver, as shown in FIG. 2, then inputted to a front end 2. A PLL/local oscillation block 4 includes PLL (phase locked loop) and local oscillation circuits controlled by a control section 3. In the front end 2, the multiplex FM signals are converted to IF signals through local oscillation frequency signals from the PLL/local oscillation block 4. The converted IF signals are then detected by an IF amplifying detector circuit 5. The detected signals are inputted to a multiplexer 6 and level-controlled minimum shift keying (LMSK) demodulation circuit 7.

Stereophonic sound signals based on the detected FM signals are reproduced in the multiplexer 6, then outputted from a speaker (not shown). In the LMSK demodulation circuit 7, the digital signals having the frame structure shown in FIG. 1 are demodulated. The modulated digital signals are synchronously reproduced in a synchronism reproducing/error correcting circuit 8 through control signals inputted from the control section 3 according to the BIC's, and simultaneously the errors of the digital signals are corrected according to their parities. The digital signals processed through the above procedure are inputted to the control section 3. The digital signals inputted to the control section 3 are processed according to a predetermined program stored in a ROM 9. Character information is reproduced from the processed digital signals to generate the reproduced characters in a display 10.

A process for correcting the errors of the digital signals demodulated by the LMSK demodulation circuit 7 is described. A block diagram of the main components following the LMSK demodulation circuit 7 is shown in FIG. 3. The demodulated digital signals are inputted to a synchronism reproducing section 11, which finds the front (start bit) of the block or frame by detecting the BIC's to realize the synchronism. The digital signals are inputted to a RAM controller 12 from the synchronism reproducing section 11. The RAM controller 12 controls the writing and reading of a frame buffer RAM 13 according to the BIC's. An error corrector 14 corrects the errors of the digital signals read from the frame buffer RAM 13 according to the parities of the read digital signals. A CRC circuit 15 detects the errors of the digital signals after the error correction by the error corrector 14 according to the CRC's. The synchronism reproducing/error correcting circuit 8 comprises the synchronism reproducing section 11, the RAM controller 12, the frame buffer RAM 13, the error corrector 14 and the CRC circuit 15.

A transfer control section 16 controls the transfer of the digital signals from the frame buffer RAM 13 to a data buffer 17. The digital signals transferred to the data buffer 17 are processed by a micro-computer 18. The processed digital signals are used for generating characters in the display 10. The control section comprises the transfer control section 16, the data buffer 17 and the micro-computer 18.

The error correction by the above mentioned circuit structure is described referring to the flow charts shown in FIGS. 4 and 5. The fronts of the blocks of the digital signal demodulated by the LMSK demodulation circuit 7 are detected through the BIC's by the synchronism reproducing section 11 (S1). The RAM controller 12 writes every block of the digital signal into the frame buffer 13 after realizing the synchronism (S2). For the 272 blocks of a frame, the first error correction in the horizontal direction is performed sequentially by the block (S3–S8). It is determined whether the block number of the block now being processed is 272 (S3). If the block number is found to be 272, then the first correction in the horizontal direction is finished.

In the error correction in the horizontal direction, the RAM controller 12 reads one block of the digital signal from the frame buffer RAM 13, then outputs the block to the error corrector 14 (S4). The error corrector 14 corrects the errors according to the parity code (S5). The CRC circuit 15 detects the remaining errors after the error correction by the error corrector 14. When no errors are detected, the block is re-written at the same address of the frame buffer RAM 13 as that from which the block was read (S6–S8). When the result from the error correction in S6 is found to be abnormal, or an error is detected in the error correction by the CRC circuit 15 in S7, the block is not re-written into the frame buffer RAM 13.

After the first error corrections in the horizontal direction for the whole frame, the error correction in the vertical direction is performed (S9–S12). The digital signal is stored in the frame buffer RAM 13 after the first error corrections in the horizontal direction. The first bits of the blocks of the digital signal (272 bits) are sequentially read from the head of the frame, and inputted to the error corrector 14 (S9). The error corrector 14 corrects the errors according to the parities (S10), and re-writes into the frame buffer RAM 13 (S11). The error corrections in the vertical direction are sequentially performed for the second bits of the blocks to the last bits. After S9–S11 are performed for the whole frame, the corrections in the vertical direction are finished.

As shown in FIG. 1, an order of blocks is interleaved when the digital signal is transmitted. Therefore, the digital signal is deinterleaved when it is stored in the frame buffer RAM 13.

The second error correction in the horizontal direction (S13–S18) is described. The second error correction is performed for the 272 blocks in the horizontal direction, in the same way as the first error correction described above.

After finishing this second error correction, the 190 data blocks are transferred to the data buffer 17 (S19). The error corrections are then performed for the next frame.

The data packet is composed of a prefix of 32 bits (or 16 bits) and a data block of 144 bits (or 160 bits), as shown in FIG. 6. The prefix is composed of a service identification (4 bits), decoding identification (1 bit), information ending (1 bit), renewal (2 bits), data group number (14 or 4 bits) and data packet number (10 or 4 bits). The decoding identification bit is used for the control of the error correction of a received digital signal. The decoding identification bit is made "1" when the data is outputted after decoding for the error correction only in the horizontal direction. The decoding identification bit is made "0" when the data is outputted after decoding for the error correction in both the horizontal and vertical directions.

When receiving the digital signals in a movable body, many data errors arise from noise and reflected waves. Therefore, the error correction is performed both in the horizontal and vertical directions even when the decoding identification bit is "1". This requires frequent accesses to the frame buffer RAM 13 even if many of the identification bits in the frame are "1", leading to large power consumption.

SUMMARY OF THE INVENTION

The object of the present invention is to control the input and output of digital signals to and from a buffer RAM using a decoding identification bit in the error correction in the horizontal or vertical direction in order to reduce the frequency of the accesses to the buffer RAM, leading to a decrease in power consumption.

In the aspect of the present invention, a frame of a digital signal has parities in the horizontal and vertical directions and a control bit included in the digital signal is referred to when the digital signal is processed in the horizontal direction. The error correction of the digital signal is controlled according to the state of the control bit.

When the bit included in the digital signal after the error correction in the vertical direction is selected, the control bit located in the horizontal direction of the selected bit is referred to, then it is determined according to the state of the control bit whether the selected bit is to be in the state before or after the error correction.

In addition, after the error correction in the vertical direction, the control bit is referred to, then it is determined according to the state of the control bit, whether the error correction in the horizontal direction is to be performed.

When the digital signal is outputted after the error correction in the horizontal direction to re-write the digital signal into the buffer RAM, the output of the bit is forbidden according to the state of the control bit located in the horizontal direction of the bit to be outputted. In correcting the errors of the digital signal in the horizontal direction (the error correction of the digital signal in the vertical direction has been already performed), the error correction is forbidden according to the state of the control bit. This makes it possible to reduce the frequency of re-writing into the buffer RAM after correcting the errors.

A device for realizing the above described digital signal processing provided by the present invention has a buffer to which a digital signal having parities in the horizontal and vertical directions and a control bit in the horizontal direction, a controller for controlling the input and output of the digital signal to and from the buffer, an error corrector to which the digital signal stored in the buffer is inputted, and which outputs the digital signal to the buffer after correcting the errors of the digital signal and a detector for detecting a control bit of the digital signal and for outputting a result obtained from the detection to the controller.

With regard to the digital signal for which the error correction in the vertical direction has been performed by the error corrector, then stored in the buffer, the controller determines whether the buffer should output the digital signal to the error corrector according to a result obtained from the detection of the control bit.

In accordance with the present invention, the frequency of re-writing the digital signal into the buffer after the error correction can be reduced when many of the control bits of the digital signal require error correction in the horizontal direction only once. This enables a reduction of the frequency of the accesses to the buffer, leading to a decrease in power consumption.

DESCRIPTION OF THE PREFERRED EMBODIMENT

Figure 1:
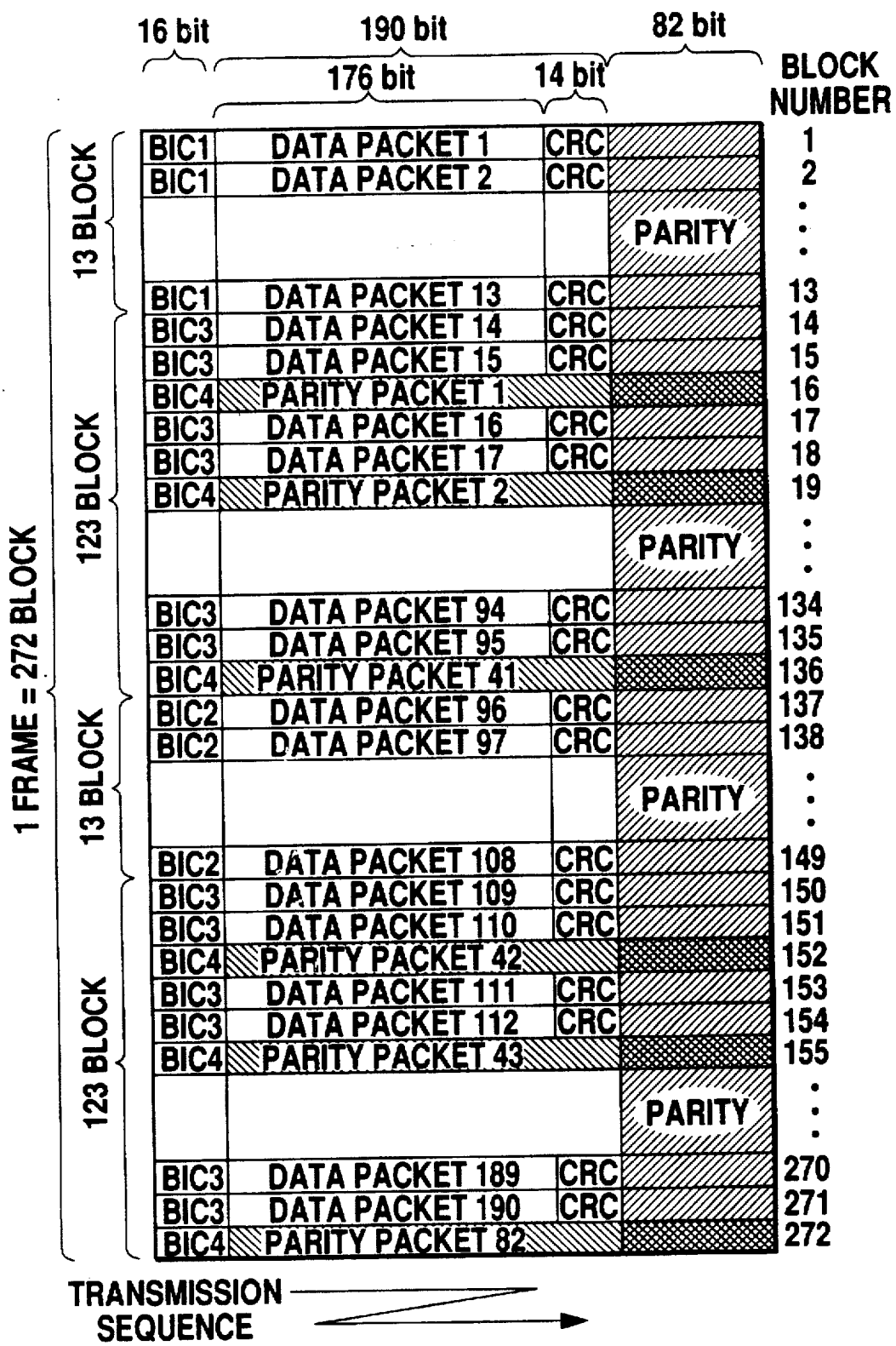
FIG. 1 shows a frame structure of a digital signal used for current multiplex FM broadcastings.
Figure 2:
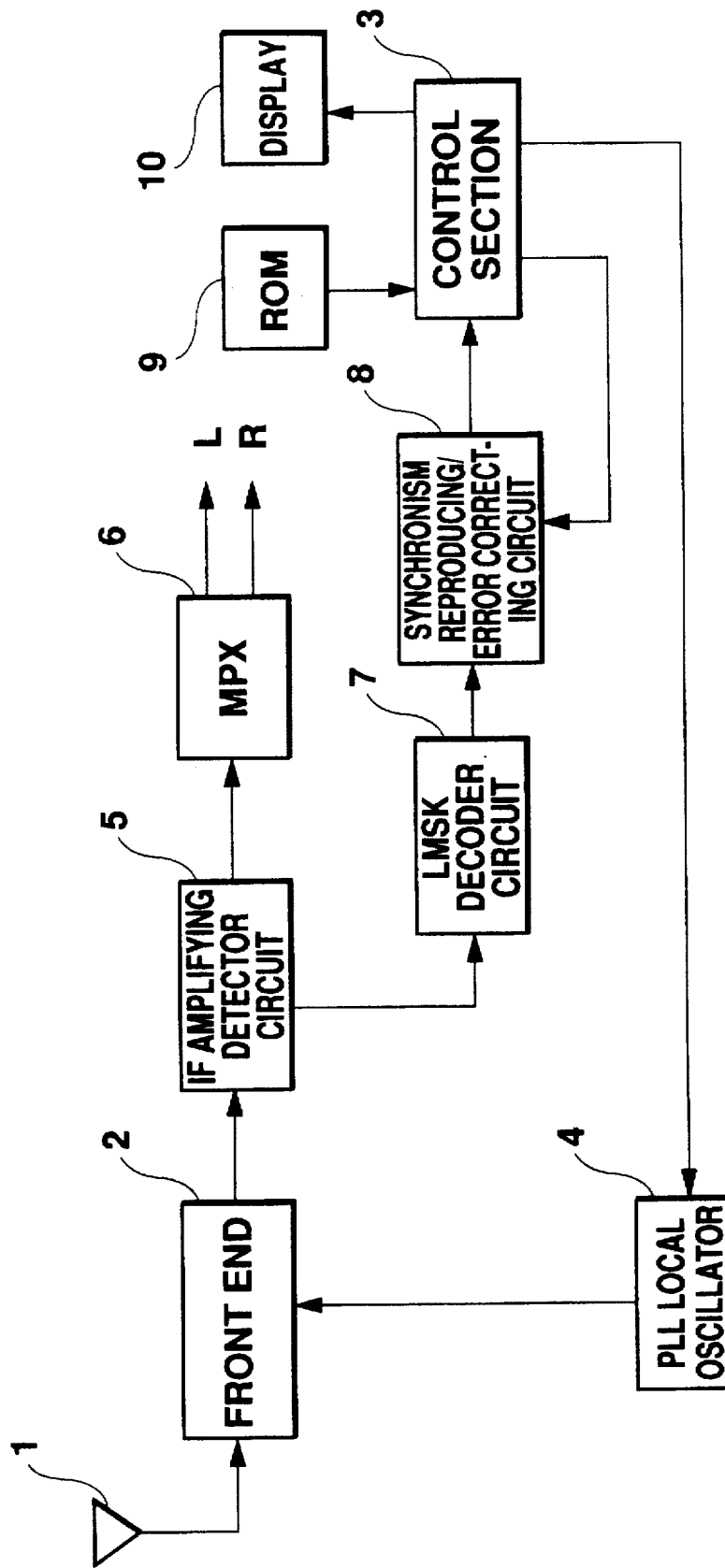
FIG. 2 shows a block diagram of a conventional multiplex FM receiver.
Figure 3:
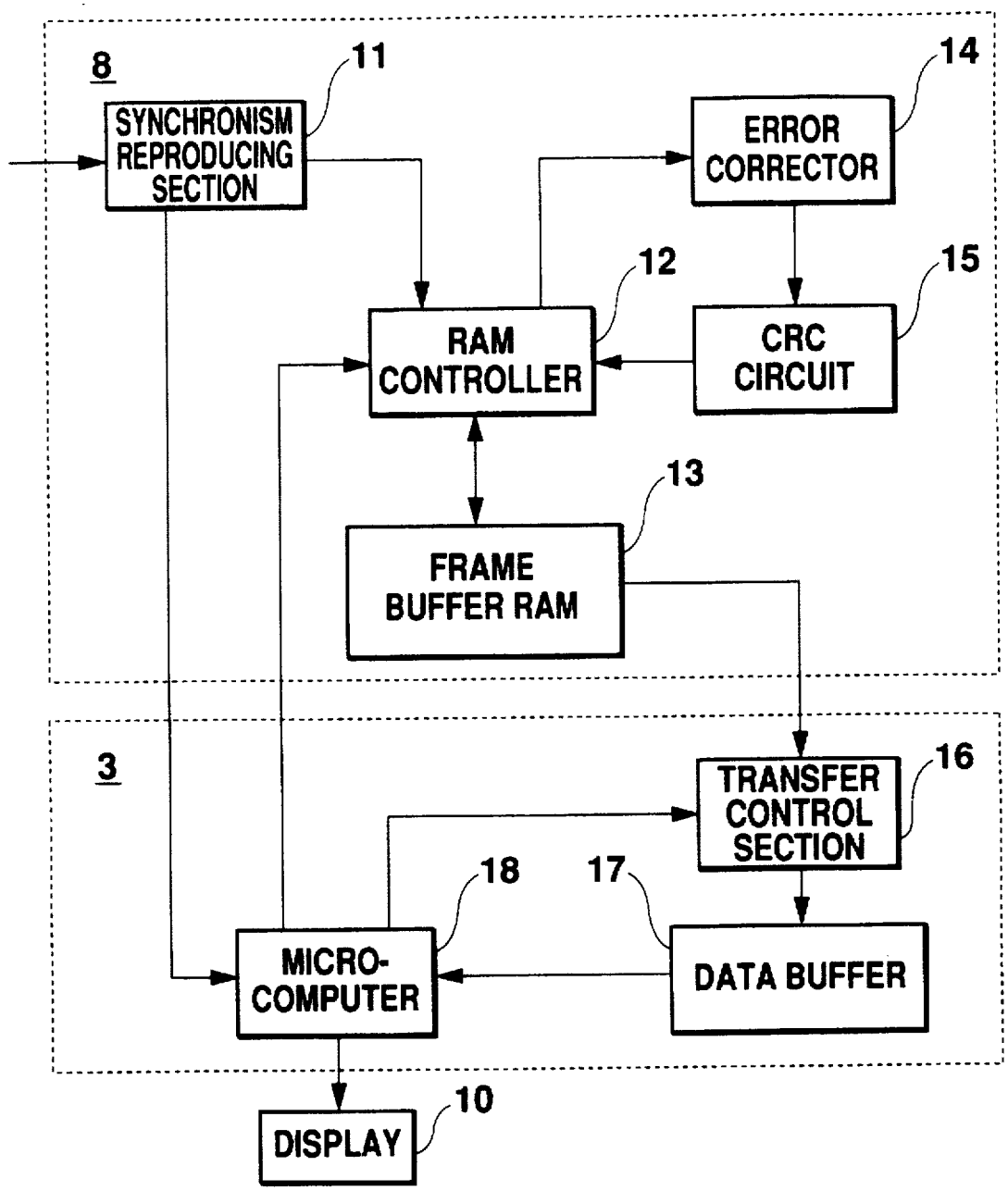
FIG. 3 shows a block diagram of the main components of a conventional multiplex FM receiver.
Figure 7:
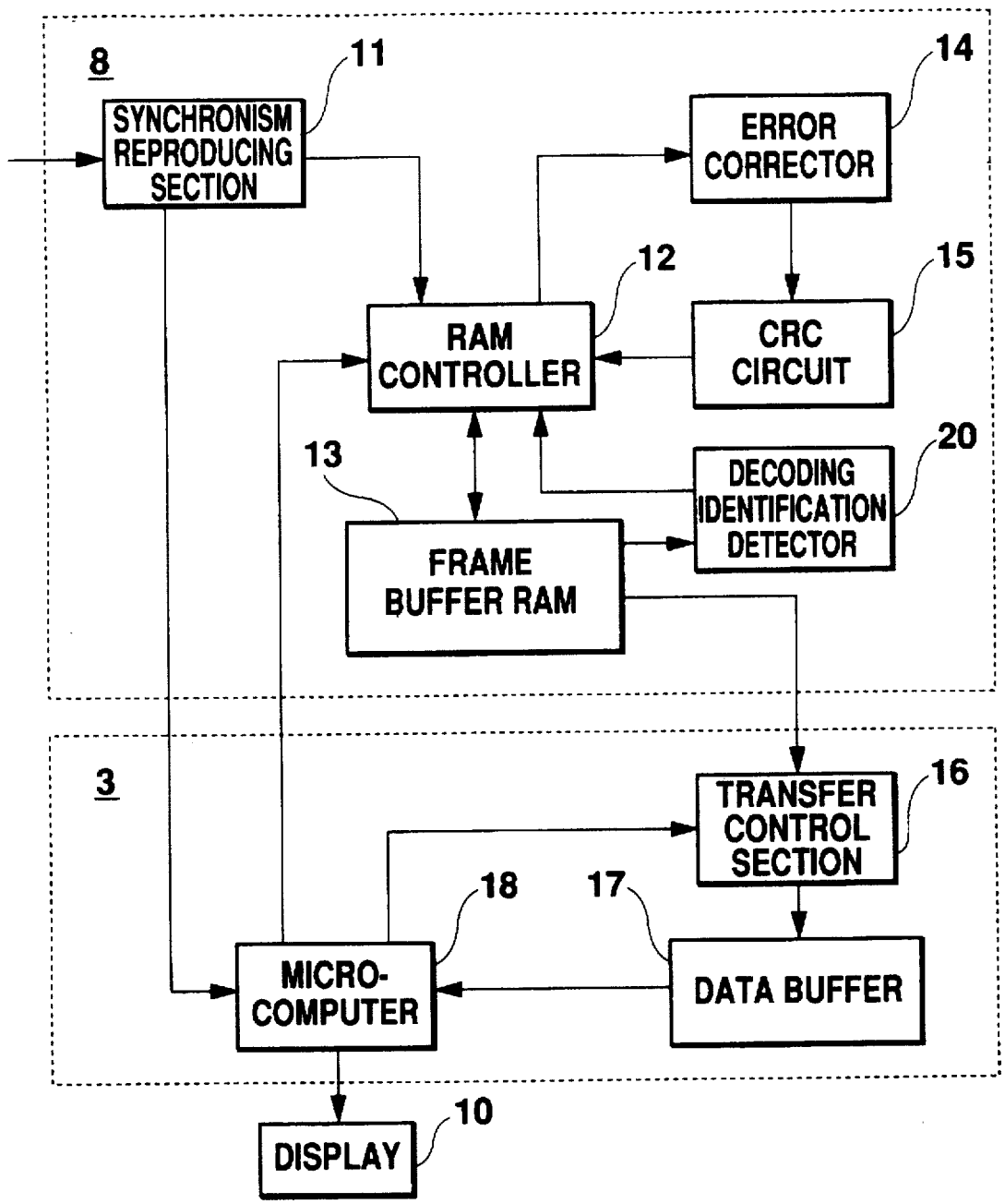
FIG. 7 shows a block diagram of the main components of a device for processing digital signals in accordance with the present invention.

The preferred embodiments of the present invention will be described with reference to the attached figures. FIG. 7 shows a block diagram of a section for correcting the errors of a digital signal in accordance with the present invention. If a component has the same function as that in FIG. 3, the same numeral is assigned to the component as in FIG. 3, and the explanation thereof is omitted. The points of difference from the current device shown in FIG. 3 are as follows: detecting a decoding identification bit of each block of the digital signal stored in a frame buffer RAM 13; and having a decoding identification detecter 20 which outputs a detecting result to a RAM controller 12.

Figure 4:
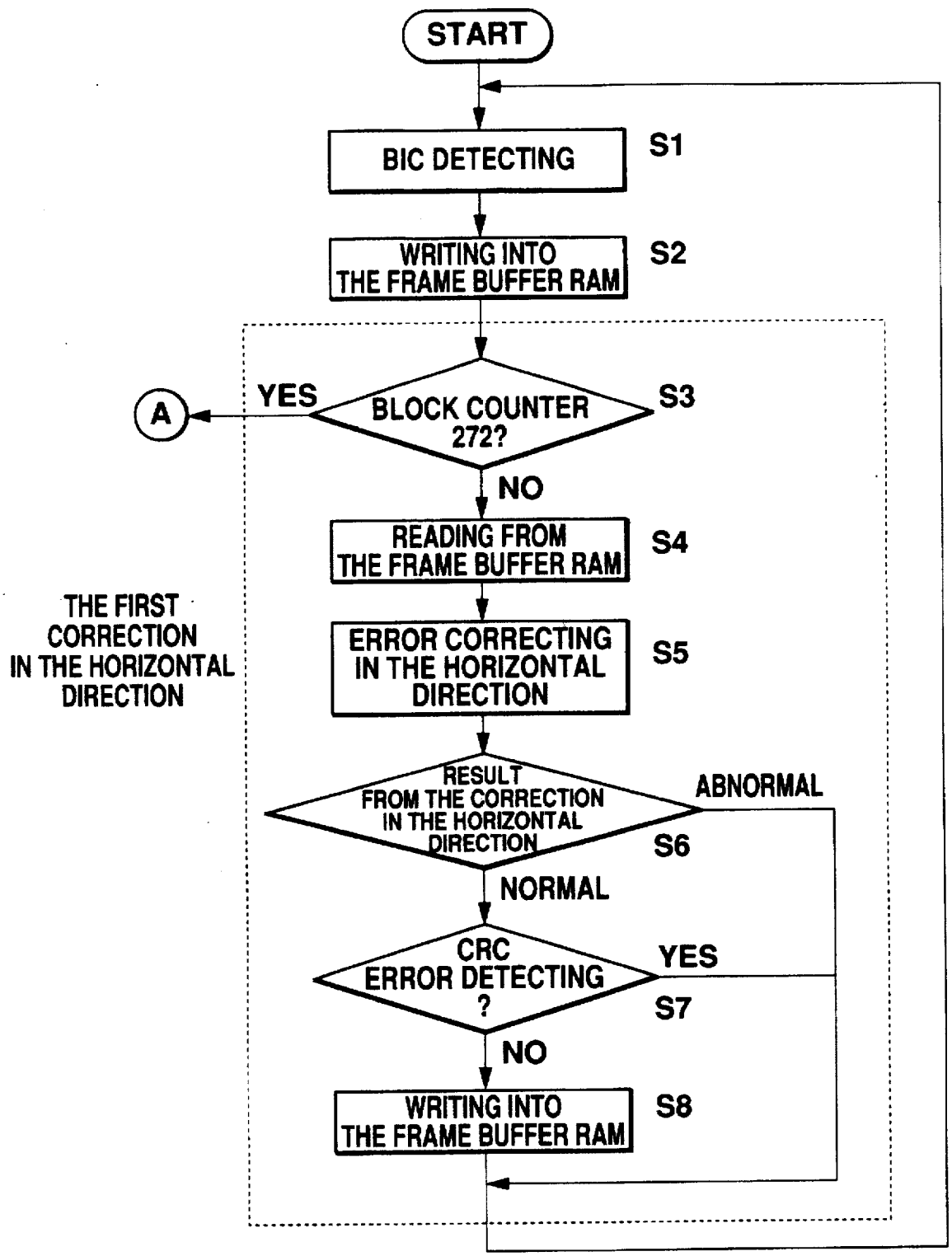
FIG. 4 shows a flow chart of a conventional digital signal processing.
Figure 5:
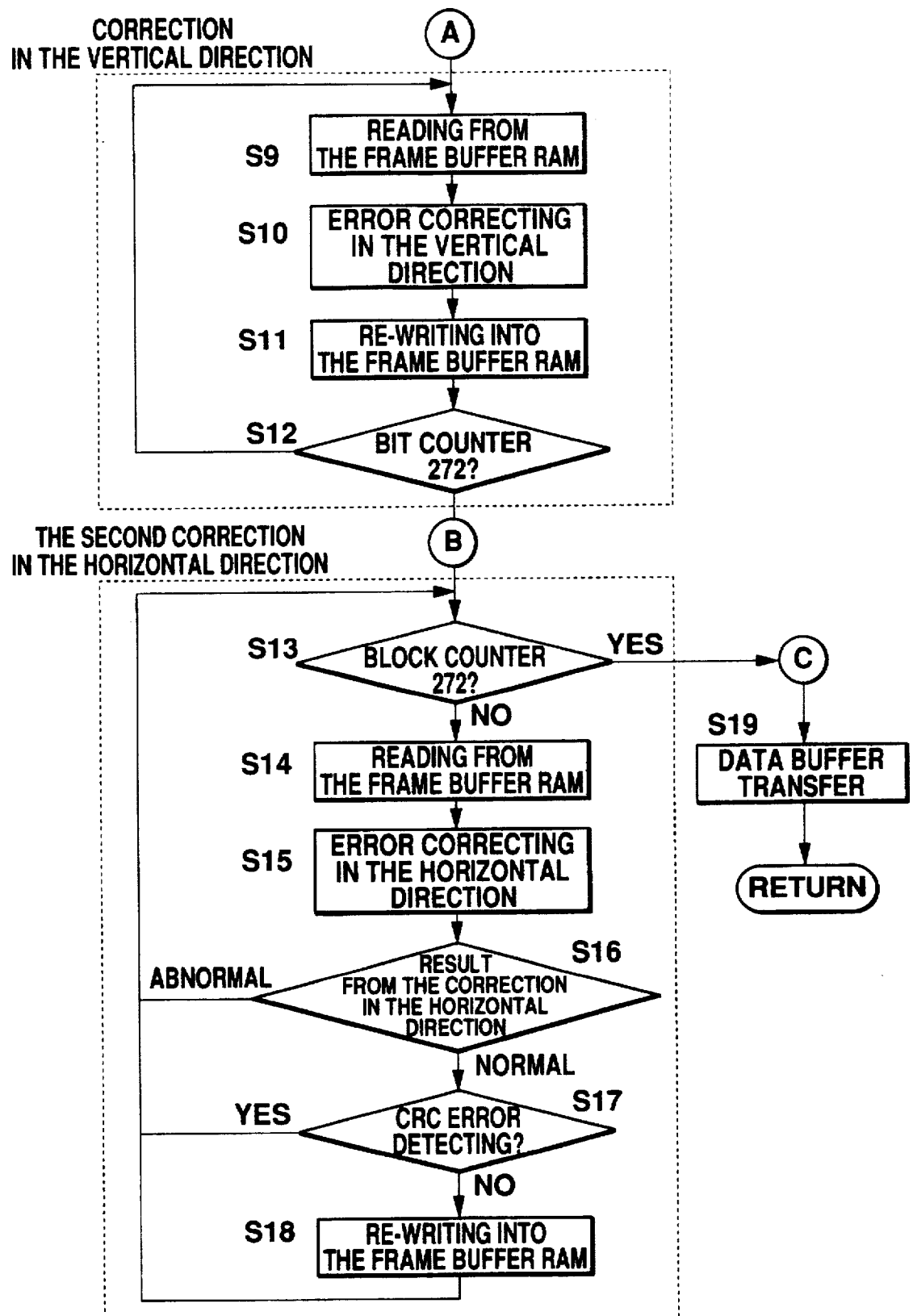
FIG. 5 shows a flow chart of a conventional digital signal processing.
Figure 6:
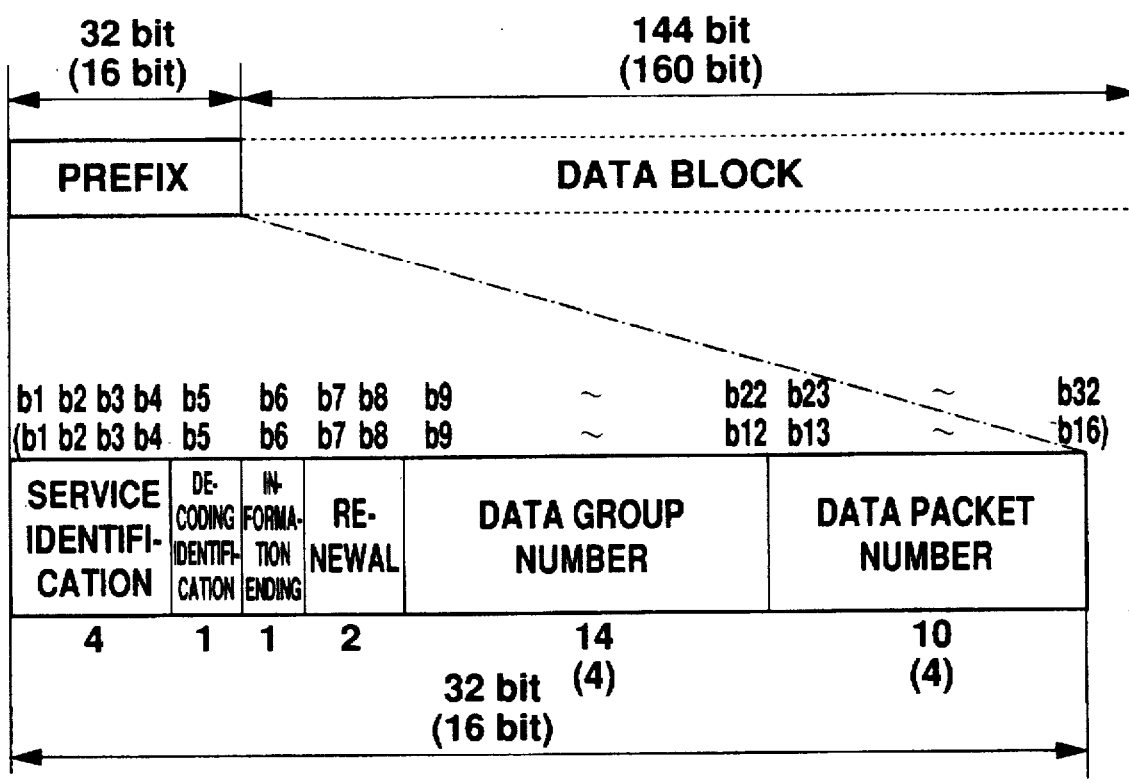
FIG. 6 shows the structure of a data packet of a digital signal used for multiplex FM broadcastings.

The operation of a digital signal processor in accordance with the present invention will be described. In the digital signal processing of the present invention, the steps of obtaining the synchronism to performing the first error correction in the horizontal direction are the same as those of the conventional device which are shown by the flow charts in FIGS. 4 and 5. The error correction in the vertical direction (steps of A to B) or the second error correction (steps of B to C) in the horizontal direction is different from the operation of the conventional device.

Figure 8:
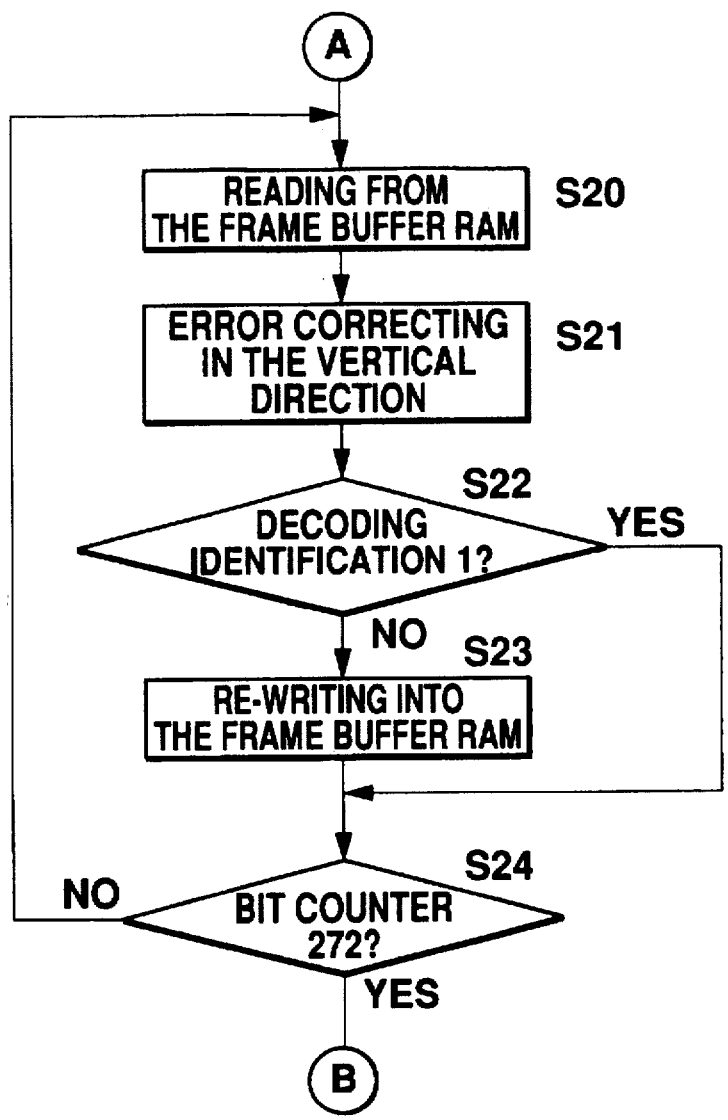
FIG. 8 shows a flow chart of a digital signal processing in accordance with the present invention.

The error correction in the vertical direction and the second error correction in the horizontal direction will be described. FIG. 8 shows a flow chart of digital signal processing in accordance with the present invention. After the first error correction in the horizontal direction, the frame of the digital signal stored in a frame buffer RAM 13 is read from its head in the vertical direction, and outputted to an error corrector 14 (S20). The error corrector 14 corrects the errors of the frame according to the parities (S21). The decoding identification detecter 20 refers to the decoding identification bit in the identical block (S22). When the decoding identification bit is "0", the block is re-written into the frame buffer RAM 13 (S23). When the decoding identification bit is "1", the block is not re-written into the frame buffer RAM 13. The processing shown in this flow chart is finished when the above described error corrections are completed for the 272 blocks in the vertical direction.

Figure 9:
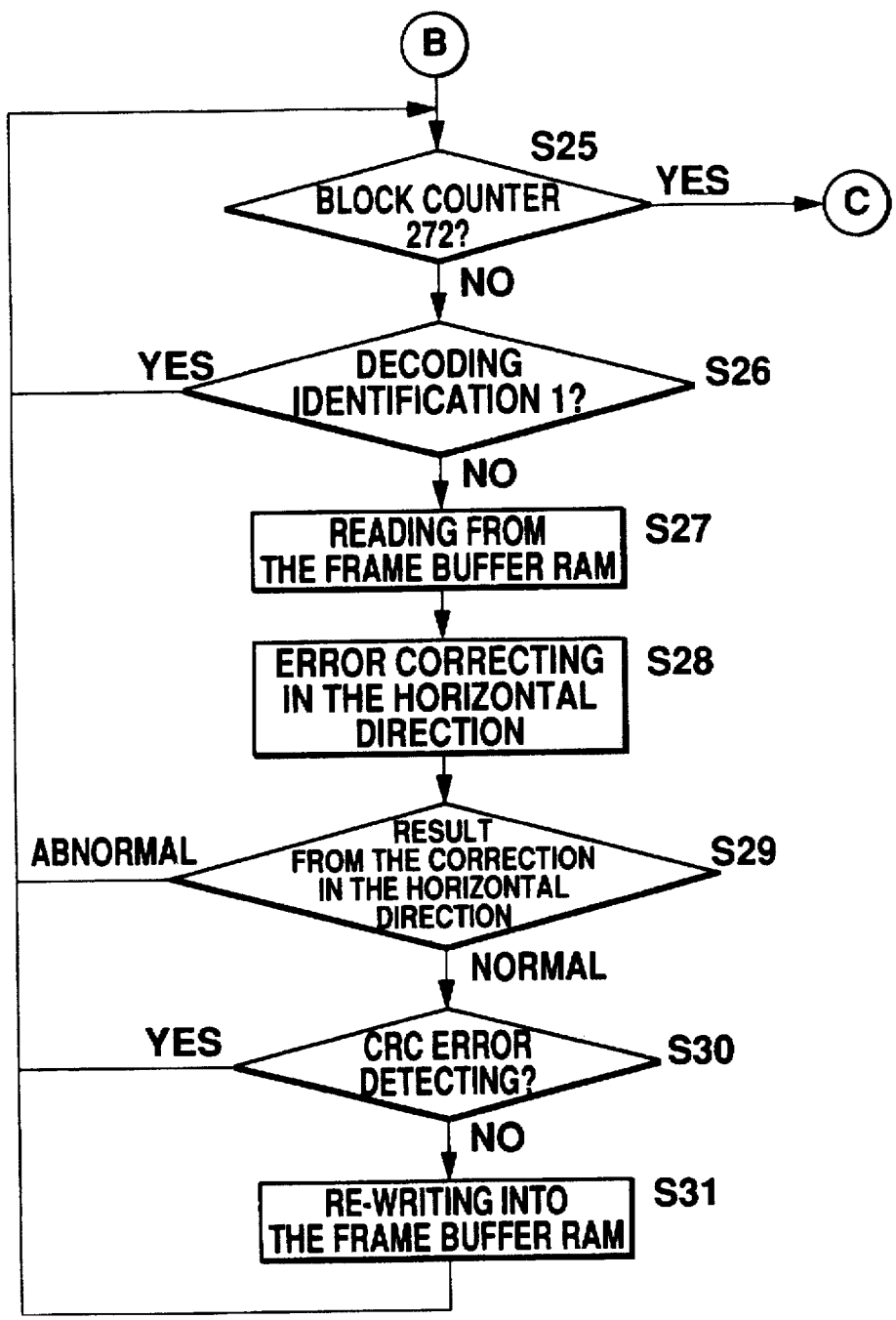
FIG. 9 shows a flow chart of a digital signal processing in accordance with the present invention.

FIG. 9 shows a flow chart of the second error correction in the horizontal direction in accordance with the present invention. After the error correction in the vertical direction, it is determined whether the decoding identification bit of the first block of the frame is "1" (S26). When the decoding identification bit is "0", the error corrector 14 reads the block of the digital signal from the frame buffer RAM 13 and corrects the errors (S28), and then the step of S29 is performed. When the decoding identification bit is "1", the next block of the digital signal is processed.

When the error correction in the step of S28 is performed normally, the detection of remaining errors is carried out in a CRC circuit 15. When the error correction in the step of S28 is not performed normally, the next block of the digital signal is processed without re-writing the present block into the frame buffer RAM. When the CRC circuit 15 does not detect any remaining errors, the block is re-written into the frame buffer RAM 13 (S31). When the CRC circuit 15 detects remaining errors, the next block of the digital signal is processed without re-writing the present block into the frame buffer RAM. The above described error corrections in the horizontal direction are performed for all 272 blocks of the frame, and then the data packets of the digital signal are transferred to a data buffer 17.

In the error correction in the vertical direction or the second error correction in the horizontal direction, the decoding identification bit of each block is referred to. When the decoding identification bit is "1", the block is not re-written into the frame buffer RAM 13. This can reduce the frequency of accesses to the frame buffer RAM 13, leading to a decrease in power consumption.

Either of the error correction in the vertical direction or the second error correction in the horizontal direction in accordance with the present invention, or both of them may be carried out in processing multiplex digital signals.

While there has been described what is at present considered to be a preferred embodiment of the present invention, it will be understood that various modifications may be made thereto, and it is intended that the appended claims cover all such modifications as fall within the true spirit and scope of the present invention.

What is claimed is:

1. A method for processing a digital signal composed of a frame which consists of a predetermined number of blocks in the vertical direction, the block consisting of a predetermined number of bits in the horizontal direction and having a horizontal error correcting code for correcting errors in the horizontal direction and a vertical error correcting code for correcting errors in the vertical direction, the block also having a control bit for controlling error correction, the method comprising the steps of referring to the control bit of the block; and controlling the error correction of the digital signal according to a state of the control bit of the block so that for a first state of the control bit error corrections are performed on the block in the horizontal direction and the vertical direction and for a second state of the control bit values of bits of the block are not altered in response to vertical error correction.

2. A method in accordance with claim 1, wherein it is determined whether a value of each bit is to be set at that before or after the error correction in the vertical direction according to the state of the control bit of a block including the bit after the error correction in the vertical direction is carried out.

3. A method in accordance with claim 1, wherein the error correction of the digital signal includes a second error correction in the horizontal direction, and it is determined whether the second horizontal error correction of bits of a block in the horizontal direction is to be carried out according to the state of the control bit of the block after the error correction in the vertical direction is carried out.

4. A method in accordance with claim 1, the control bit indicating the necessity of error corrections in both the horizontal and vertical directions or only error correction in the horizontal direction, wherein error correction in the vertical direction is carried out after error correction in the horizontal direction, a value of a bit before the error correction in the vertical direction is adopted when only error correction in the horizontal direction is needed, or a value of a bit after the error correction in the vertical direction is applied when error correction in the vertical direction is also needed.

5. A method in accordance with claim 1, wherein the error correction of the digital signal includes first error correction in the horizontal direction and error correction in the vertical direction after the first error correction in the horizontal direction and second error correction in the horizontal direction after the error correction in the vertical direction, the control bit indicating the necessity of only the first error correction in the horizontal direction or also the error correction in the vertical direction and the second error correction in the horizontal direction, a value of a bit before the error correction in the vertical direction is applied to the bit when only the error correction in the horizontal direction is needed, or a value of a bit after the error correction in the vertical direction is applied to the bit when the error correction in the vertical direction is also needed, the second error correction in the horizontal direction is not carried out when the second error correction in the horizontal is not needed, or the error correction in the vertical direction and the second error correction in the horizontal direction are also carried out when the error correction in the vertical direction and the second error correction in the horizontal direction are needed.

6. A method for processing a digital signal composed of a frame which consists of a predetermined number of blocks in the vertical direction, the block consisting of a predetermined number of bits in the horizontal direction and having a horizontal parity for correcting errors in the horizontal direction and a vertical parity for correcting errors in the vertical direction, the block also having a control bit for controlling the error correction the method comprising the steps of:

correcting the errors in the vertical direction;

detecting a state of the control bit of a block including each bit in the vertical direction, the step of detecting performed after the error correction in the vertical direction;

applying a value of a bit before the error correction in the vertical direction to the bit when the state of the control bit indicates that only the error correction in the horizontal direction is needed or applying the value of the bit after the error correction in the vertical direction to the bit when the state of the control bit indicates that the error correction in the vertical direction is also needed;

referring to the control bit of the block including each bit after applying either value; and determining whether the error correction in the horizontal direction is to be further carried out according to the state of the control bit.

7. An apparatus for correcting an error of a digital signal composed of a frame including received data, the frame consisting of a predetermined number of blocks in a vertical direction, each block consisting of a predetermined number of bits in a horizontal direction, the frame including various information as a digital signal, the frame further including a horizontal error correcting code used for correcting an error of a block and a vertical error correcting code used for correcting an error of the frame, the apparatus comprising:

a buffer for storing the digital signal of the frame after carrying out the horizontal error correction or the vertical error correction; and a detector for detecting whether a logical value of a control bit included in the block is "1" or "0", the detector detecting the state of the control bit after carrying out the first horizontal error correction and the subsequent vertical error correction, wherein if the logical value of the control bit is one value, the result of the vertical error correction is written in the buffer instead of the digital signal after the first horizontal error correction, and, if the logical value of the control bit is the other value, the result of the vertical error correction is ignored.

8. The apparatus according to claim 7, wherein the buffer stores one frame of the digital signal.

9. The apparatus according to claim 8, further comprising:

an error corrector that carries out the error corrections in the horizontal and vertical directions; and a controller, responsive to the logical value of the control, operative after the error correction in the vertical direction, the controller controlling whether a bit of the digital signal is to be re-written into the buffer.

10. The apparatus according to claim 9, wherein the control bit indicates whether the error correction in the vertical direction is to be carried out, and the controller does not provide the digital signal after the error correction of the blocks in the vertical direction to the buffer when the control bit indicates that error correction in the vertical direction is not necessary.

11. The apparatus according to claim 9, wherein the control bit indicates whether the error correction in the horizontal direction after the error correction in the vertical direction is to be carried out, and the controller does not provide the block of the digital signal including the control bit to the error corrector when the control bit indicates that error correction in the horizontal direction is not necessary.

12. The apparatus according to claim 7, wherein when the state of said control bit is detected after carrying out the vertical error correction for one frame, if the logical value of said control bit is one logical value, the result of the second horizontal error correction is written in the buffer instead of the result of the first horizontal error correction or the vertical error correction, and, if the logical value of said control bit is the other logical value, the result of the second horizontal error correction is ignored.

13. The apparatus to claim 7, wherein the frame included in the digital signal is transmitted by superimposing the digital signal on an FM multiplexed broadcast.

14. The apparatus of claim 12, wherein the buffer is a random access memory.

* * * * *